Patented May 2, 1944

2,348,159

UNITED STATES PATENT OFFICE 2,348,159

PRODUCTION OF ACYCLIC CONDENSATION PRODUCTS OF ACETYLENE

Hanns Peter Staudinger, Ewell, and Karl Heinrich Walter Tuerck, Banstead, England, assignors to The Distillers Company Limited, Edinburgh, Scotland, a British company No Drawing. Application January 22, 1941, Serial No. 375,538. In Great Britain January 6, 1940

3 Claims. (Cl. 260—483)

This invention is for improvements in or relating to the production of acyclic condensation products of acetylene.

It has already been shown that acetylene will react exothermically with ethyl aceto-acetate to give products which consist mainly of cyclic compounds, for example, dimethyl cyclohexanone carboxylic acid esters or their corresponding ketones. Only very small amounts of acyclic compounds were obtained, however, at the same time.

It is an object of the present invention to produce acyclic unsaturated products by the condensation of acetylene with certain compounds containing reactive methylene groups whilst avoiding as far as possible the formation of cyclic products.

According to the present invention a process for the manufacture of acyclic compounds of acetoacetic ester by reacting acetylene with an acetoacetic ester compound of the general formular $CH_3CO \cdot CHR_1 \cdot COOR_2$ wherein $R_1$ is selected from the group consisting of hydrogen, alkyl and aryl groups and $R_2$ is selected from the group consisting of alkyl and aryl groups in the presence of an inorganic mercury salt as catalyst comprises the steps consisting in forming said mercury salt in situ by reacing a mercury compound with not more than a slight excess of an inorganic acid in the presence of said acetoacetic ester compound and passing acetylene into the reaction mixture whilst cooling to maintain the temperature of said reaction mixture below 30° C. throughout the reaction whereby the formation of cyclic products is substantially completely prevented. The optimum temperature for the reaction varies according to the substances with which acetylene is reacted, and the nature of the catalyst used. Such optimum temperatures may be determined by preliminary tests carried out at various temperatures, or by allowing the temperature to rise until active reaction takes place, which is evident by a rapid absorption of acetylene. By reactive methylene groups is meant a methylene group having in the α-position, two electro-negative substituents such as a carbonyl group, a carboxyl or carbalkoxy group, a nitrile group or an imide group; it will be appreciated that the electro-negative groups may be the same, as in malonic ester and acetyl acetone or may be different as in acetoacetic ester and cyanoacetic ester.

A feature of the invention consists in that the condensation reaction is carried out at normal or elevated pressure in the presence of catalysts which have been already described for the production of vinyl esters and vinyl ethers from acetylene. Examples of such catalysts are the mercuric salts of inorganic acids, especially mercuric sulphate which is advantageously formed in situ. We have also found that it is necessary to have not more than a slight excess of inorganic acid present in the reaction mixture and it may even be advisable to have no excess of inorganic acid present. With a catalyst solution containing an excess of inorganic acid, the temperature must be regulated more carefully than when no excess acid is present. When the product is recovered by distillation it is preferable to neutralise the catalyst before distillation to avoid decomposition.

Example 1

3 grms. of mercuric oxide were heated with 130 grms. of ethyl acetoacetate until the yellow colour changed to white, 1.1 grms. of concentrated sulphuric acid were then added drop by drop so that the white precipitate first went into solution and then separated out as a flocculent precipitate. Into this mixture acetylene was introduced whilst the whole was agitated continuously. The acetylene was readily absorbed and the reaction mixture was maintained at 13° C. for 3 hours. After neutralising the product with sodium bicarbonate and filtering off the mercuric sludge, the product was fractionated "in vacuo" to yield 39.2% of unchanged ethyl acetoacetate (B. P. 44° C. at 4 mm. pressure) and 60.8% of a fraction, boiling at 48–50° C. at 4 mm. pressure, consisting of ethyl-α-vinyl-acetoacetic ester (or, more correctly perhaps, α-acetyl-vinyl-acetic ethyl ester). No higher boiling compounds were found in the reaction products.

Example 2

In 50 grms. of ethyl ethylacetoacetate were suspended 2 grms. of yellow mercuric oxide, some drops of acetic acid were added (about 1 grm.) and the mixture heated till the yellow colour turned white. 1.0 grm. of concentrated sulphuric acid was then added drop by drop, the mixture was cooled to 15–20° C., acetylene introduced with continuous agitation and the temperature maintained at 20° C.; the catalyst was finally neutralised by sodium bicarbonate and whole reaction mixture was filtered. The product was then distilled under 7 mm. pressure and 50% of the distillate obtained consisted of unchanged ethyl ethylacetoacetate and about 44.4% was a fraction boiling at 70–73° C. containing 94.6% of the condensation product of acetylene with ethyl ethylacetoacetate, namely ethyl-α-vinyl-ethylacetoacetate.

The unsaturated compounds produced according to the invention are useful intermediates and they may, for example, be hydrogenated to the corresponding saturated compounds, subjected to the usual addition reactions common to olefinic double bonds, for example, halogenation or utilised in the usual aceto-acetic ester condensation reactions. They may also be used for the formation of polymerized resinous materials by polymerisation either with or without other polymerisable substances, e. g., styrene, vinyl-esters or acrylic derivatives.

What we claim is:

1. α-acetyl-vinyl-acetic ethyl ester.
2. In the process for the manufacture of acyclic compounds of acetoacetic ester by reacting acetylene with an acetoacetic ester compound of the general formula $CH_3CO \cdot CHR_1 \cdot COOR_2$ wherein $R_1$ is selected from the group consisting of hydrogen and alkyl and $R_2$ is alkyl in the presence of an inorganic mercury salt as catalyst the steps consisting in forming said mercury salt in situ by reacting a mercury compound with not more than a slight excess of an inorganic acid in the presence of said acetoacetic ester compound and passing acetylene into the reaction mixture whilst cooling to maintain the temperature of said reaction mixture below 30° C. throughout the reaction whereby the formation of cyclic products is substantially completely prevented.
3. As new compositions of matter, acyclic α-vinyl acetoacetic ester compounds of the general formula $CH_3CO-CR_1(CH=CH_2)-COOR_2$ wherein $R_1$ is selected from the group consisting of hydrogen and alkyl and $R_2$ is alkyl.

HANNS PETER STAUDINGER.
KARL HEINRICH WALTER TUERCK.